(12) United States Patent
Yonekawa

(10) Patent No.: US 7,286,780 B2
(45) Date of Patent: Oct. 23, 2007

(54) IMAGE FORMATION APPARATUS WITH TEMPERATURE CONTROLLER

(75) Inventor: Ryo Yonekawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 131 days.

(21) Appl. No.: 11/167,644

(22) Filed: Jun. 27, 2005

(65) Prior Publication Data

US 2005/0286921 A1    Dec. 29, 2005

(30) Foreign Application Priority Data

Jun. 29, 2004    (JP)    ............... 2004-191512

(51) Int. Cl.
*G03G 15/20*    (2006.01)
(52) U.S. Cl. .............. 399/67; 399/69; 399/70
(58) Field of Classification Search .......... 399/33, 399/69, 70
See application file for complete search history.

(56) References Cited

U.S. PATENT DOCUMENTS 4,703,886 A    11/1987   Kirby
6,959,158 B2 *  10/2005  Ohta .......................... 399/69

FOREIGN PATENT DOCUMENTS

JP    7-55589    3/1995
JP    8-292107   11/1996

OTHER PUBLICATIONS

European Search Report for European Application No. EP 05 01 3958 mailed on Sep. 19, 2005, 3 pages.
Patent Abstracts of Japan, Publication No. 07-055589, Publication Date: Mar. 3, 1995, 1 page.
Patent Abstracts of Japan, Publication No. 08-292107, Publication Date: Nov. 5, 1996, 1 page.

* cited by examiner

*Primary Examiner*—David M. Gray
*Assistant Examiner*—David A Blackshire
(74) *Attorney, Agent, or Firm*—Osha Liang LLP

(57) ABSTRACT

In a temperature detector a smoother circuit receives a pulse signal generated by a pulse signal generation circuit to smooth the signal and transmit it to a first node. A comparator compares a level in voltage transmitted on the node with that in voltage on a second node connected to a thermistor element line and outputs a resultant comparison as a detection signal to a heater controller. The temperature detector can have on the first node a reference voltage adjustable by a duty ratio of the pulse signal output by the pulse signal generation circuit. A resistor or similar component can be dispensed with and simply by adjusting the pulse signal's duty ratio the reference voltage can be adjusted. Temperature can thus be detected with high precision.

7 Claims, 3 Drawing Sheets

IMAGE FORMATION APPARATUS WITH TEMPERATURE CONTROLLER

BACKGROUND OF THE INVENTION

1. Field of the Invention

The present invention relates to thermal fixation in printers and similar image formation apparatuses and particularly to detecting the temperature of a hot roller.

2. Description of the Background Art

Laser printers corresponding to conventional image formation apparatuses receive image data from a host and process the data at an image formation unit. More specifically, a photosensitive material is exposed to laser light to form an electrostatic latent image which attracts charged toner and is developed, and a sheet is brought into close contact with the photoreceptor to receive the toned image which is in turn fused to provide a permanent image.

In connection with the thermal fixation a conventional laser printer provides thermal fixation at a fuser internally provided with a movable fusing member implemented by a hot roller having a surface with a thermistor attached thereto. The thermistor is a temperature detection device decreasing in resistance as it is heated, and is generally used to detect the hot roller's surface temperature. It is used to exert control to set the hot roller's surface temperature for example around 180 to 200° C., which allows efficient thermal fixation.

In connection with this temperature control, the thermistor or the like provides analog output, which may have its voltage value linearly read for example via a microcomputer or ASIC's analog port and from the read voltage value the temperature may be detected and the surface temperature may thus be controlled. However, the analog port, having a function reading the voltage value linearly, is controlled in a complicated manner and is also an expensive component. Accordingly, it is suggested to replace the analog port with an AD converter converting an analog output to a digital output and detect temperature from the output of the AD converter.

For example, Japanese Patent Laying-Open No. 07-055589 discloses an AD converter for temperature control wherein a temperature detected of a temperature measuring thermistor is detected by the AD converter. More specifically the document discloses that a plurality of resistors are used so that a threshold value obtained by resistance division can be used to detect temperature at a plurality of temperature measuring points.

The AD converter for temperature control that employs a plurality of resistors to measure temperature at a plurality of temperature measuring points, however, has variation between the resistors, and temperature cannot be detected with precision.

Furthermore, if the number of temperature measuring points is increased a plurality of resistors different in resistance must accordingly be provided. This disadvantageously results in increased number of components and hence increased area for mounting.

SUMMARY OF THE INVENTION

The present invention has been made to overcome the above disadvantages and it contemplates an image formation apparatus including a temperature controller capable of detecting temperature with high precision and also contributing to reduced area for mounting.

The present invention provides an image formation apparatus including: a fuser having a heater used in forming an image to provide thermal fixation; a temperature detector detecting temperature of the fuser; and a temperature controller controlling the heater based on a resultant detection of the temperature detector. The fuser includes a hot roller heated by thermal conduction provided by the heater, a pressurization roller cooperating with the hot roller to pressurize a sheet inserted, and a temperature detection element transmitting a voltage in accordance with a temperature. The temperature controller includes a pulse signal generation circuit operative in response to instruction to output a pulse signal and also adjust duty ratio of the pulse signal, and a first digital port outputting the pulse signal from the pulse signal generation circuit, a second digital port receiving a digital signal corresponding to the resultant detection of the temperature detector. The temperature detector includes a smoother circuit receiving the pulse signal from the pulse signal generation circuit to smooth and output the pulse signal as a reference voltage, and a comparator comparing the voltage transmitted from the temperature detection element with the reference voltage to output a resultant comparison to the temperature controller. The pulse signal generation circuit adjusts the duty ratio of pulse signal in accordance with a mode.

The present invention provides an image formation apparatus including: a fuser having a heater used in forming an image to provide thermal fixation; a temperature detector detecting temperature of the fuser; and a temperature controller controlling the heater based on a resultant detection of the temperature detector. The fuser includes a temperature detection element transmitting a voltage in accordance with a temperature. The temperature controller includes a pulse signal generation circuit operative in response to instruction to output a pulse signal and also adjust the duty ratio of the pulse signal. The temperature detector includes a smoother circuit receiving the pulse signal from the pulse signal generation circuit to smooth and output the pulse signal as a reference voltage, and a comparator comparing the voltage transmitted from the temperature detection element with the reference voltage to output a resultant comparison to the temperature controller.

Preferably the temperature controller further includes a first digital port outputting the pulse signal from the pulse signal generation circuit, and a second digital port receiving a digital signal corresponding to the resultant detection of the temperature detector.

Preferably the fuser further includes a hot roller heated by thermal conduction provided by the heater, and a pressurization roller cooperating with the hot roller to pressurize a sheet inserted.

Preferably the pulse signal generation circuit adjusts the duty ratio of the pulse signal in accordance with a mode.

The present image formation apparatus includes a temperature detector having a comparator comparing a voltage transmitted from a temperature detection element with a reference voltage, and a smoother circuit smoothing and outputting a pulse signal as a reference voltage. The pulse signal is output by a pulse signal generation circuit capable of adjusting the pulse signal's duty ratio. In other words, the temperature detector can have a reference voltage adjustable by the duty ratio of the pulse signal output by the pulse signal generation circuit. A resistor or similar component can be dispensed with and simply by adjusting the pulse signal's duty ratio a voltage can be adjusted. Temperature can thus be detected with high precision, controllability improved, and the number of components and hence the area for mounting reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in an embodiment will be described with reference to the drawings. In the figures, identical or like components are identically denoted.

Figure 1:
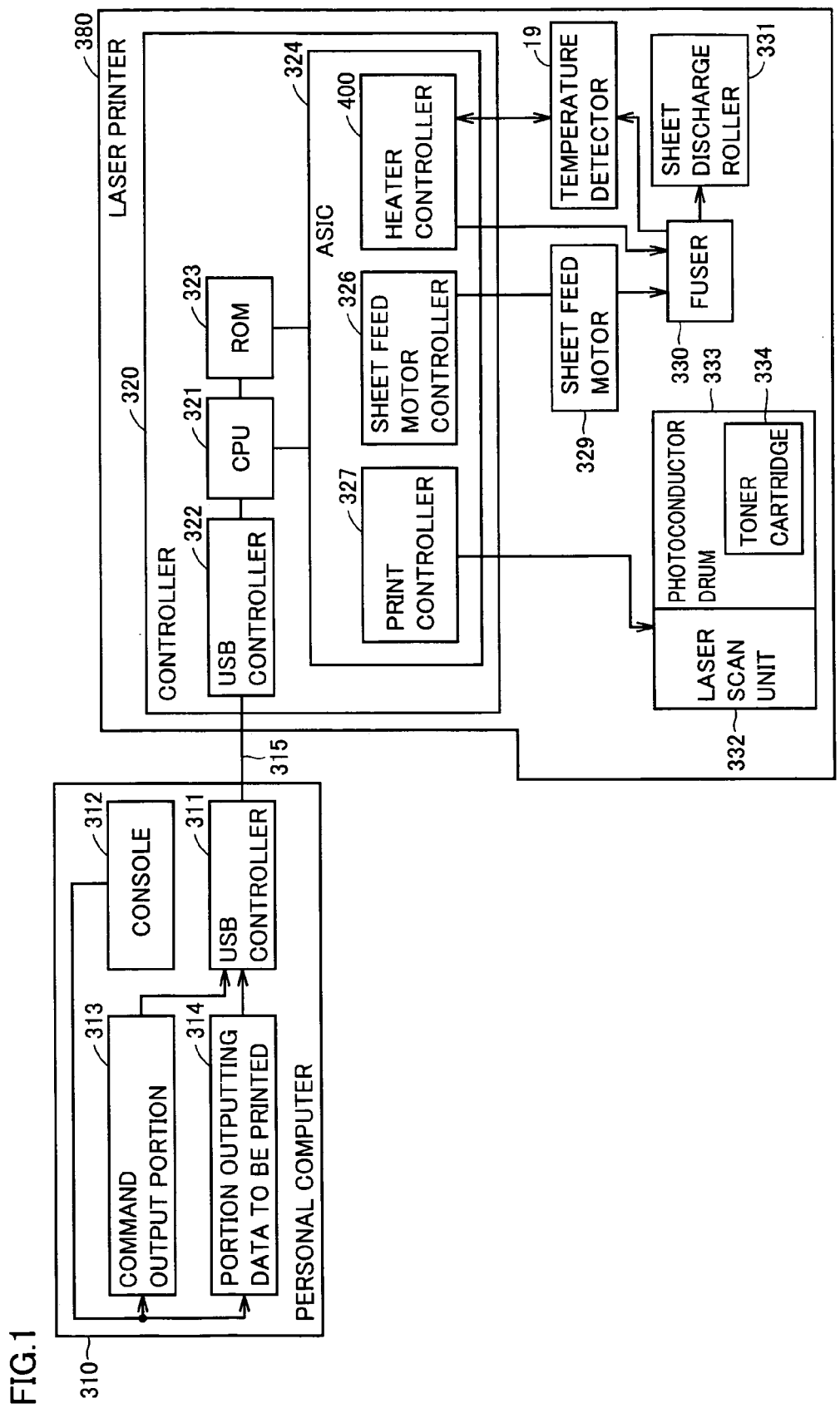
FIG. 1 shows an external configuration of an image formation apparatus in accordance with an embodiment of the present invention.

With reference to FIG. 1, a personal computer 310 is a device controlling a laser printer 380 corresponding to an image formation apparatus according to an embodiment of the present invention and includes a USB controller 311, a console 312, a command output portion 313, and a portion outputting data to be printed 314.

Console 312 receives instruction from a user for printing. Portion 314 is implemented by a program and a CPU executing the program and outputs data to be printed. Command output portion 313 is implemented by a program and a CPU executing the program and outputs a sheet feed command, a print start command, a sheet discharge command and other various commands. USB controller 311 outputs the commands and the data to be printed on a USB cable 315.

Laser printer 380 includes a controller 320, a laser scan unit 332, a photoconductor drum 333, a toner cartridge 334, a sheet feed motor 329, a fuser 330, a sheet discharge roller 331, and a temperature detector 19.

Controller 320 includes a CPU 321, a USB controller 322, a ROM 323, and an ASIC 324. ROM 323 has stored therein a program executed by CPU 321. USB controller 322 receives the commands, which are a sheet feed command, a print start command, a sheet discharge command and other various commands, and the data to be printed transmitted from personal computer 310 on USB cable 315.

ASIC 324 includes a sheet feed motor controller 326, a print controller 327, and a heater controller 400 controlling fuser 330.

Sheet feed motor controller 326 controls the driving of sheet feed motor 329. Sheet feed motor 329 drives a roller (not shown) to transport a sheet. As the roller rotates, the roller's rotation is transmitted to a roller in fuser 330 and to sheet discharge roller 331 and thus rotates them to transport the fed sheet.

When CPU 321 receives the sheet feed command, CPU 321 instructs sheet feed motor controller 321 to drive sheet feed motor 329.

When CPU 321 receives the data to be printed together with the print start command, CPU 321 outputs the data to laser scan unit 332 in response to instruction issued from print controller 327. Laser scan unit 332 outputs toward photoconductor drum 333 laser light corresponding to an image to be printed. Thus on photoconductor drum 333 a latent image corresponding to the image to be printed is formed. Photoconductor drum 333 with the latent image formed thereon is rotated and thus receives toner thereon from toner cartridge 334. The toner is attracted on photoconductor drum 333 in a pattern corresponding to the image to be printed. Subsequently, a sheet is brought into contact with photoconductor drum 333 and thus receives the pattern formed on photoconductor drum 333, when fuser 330 effects thermal fixation by a hot roller, as described above.

When CPU 321 receives the sheet discharge command, CPU 321 instructs sheet feed motor controller 326 to drive sheet feed motor 329 to discharge a printed sheet.

Figure 2:
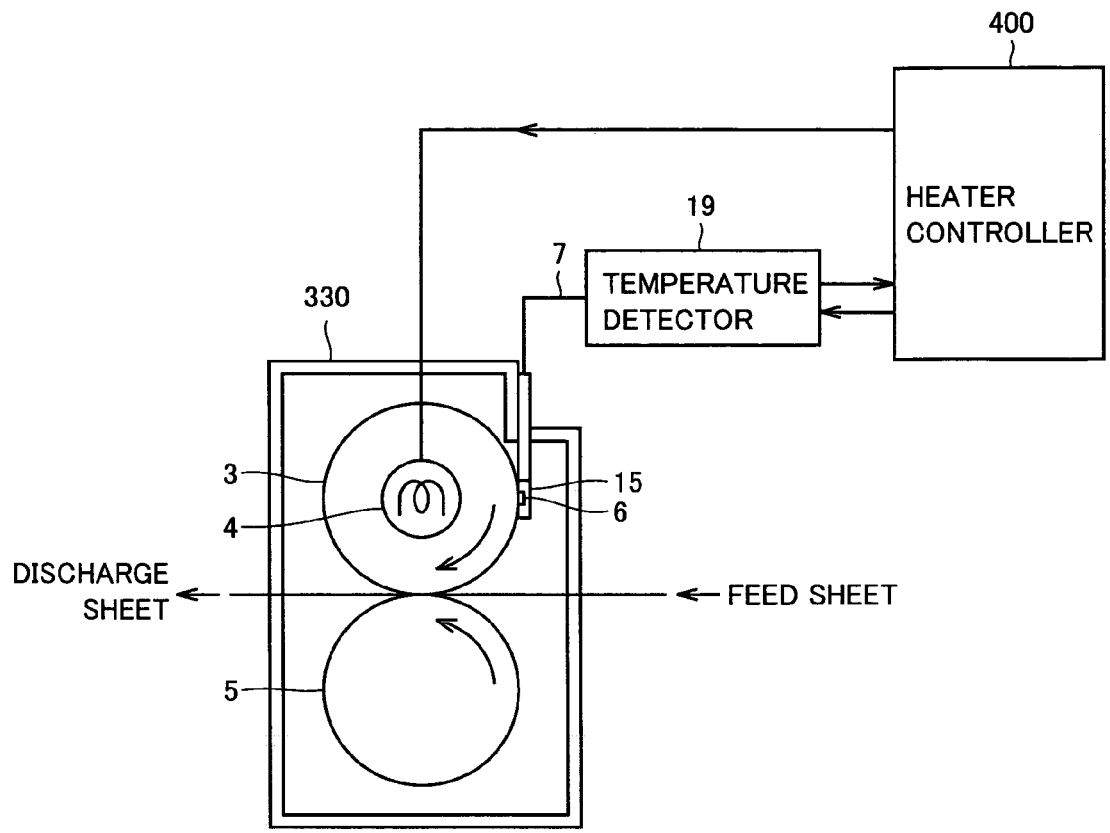
FIG. 2 shows a schematic configuration of a fuser, a temperature detector and a heater controller according to an embodiment of the present invention.

With reference to FIG. 2, fuser 330 internally includes a hot roller 3 serving as a movable fusing member, a pressurization roller 5 pressed into contact with hot roller 3, and a heater lamp 4 arranged internal to hot roller 3 and turn on to heat hot roller 3.

A thermistor 6 is a temperature detection element decreasing in resistance when it is heated, as has previously been described. Thermistor 6 is attached to hot roller 3 to abut against a surface thereof, and varies in resistance in response to the hot roller 3 temperature and thus detects the hot roller 3 surface temperature. Thermistor 6 is arranged at an end of a synthetic resin member 15.

The temperature detected by thermistor 6 is transmitted on a thermistor element line 7 in the form of an analog voltage to temperature detector 19. Temperature detector 19 compares the received analog voltage with a reference voltage to provide a result and is driven thereby to output a corresponding detection signal to heater controller 400.

Heater controller 400 operates in response to the detection signal output from temperature detector 19 to turn on/off heater lamp 4 to control hot roller 3 to have a prescribed temperature.

In general, as a laser printer has a variety of modes, hot roller 3 should accordingly be set to have different temperatures to correspond to the modes. As has been described previously, for example for a print mode, a high temperature (of approximately 180-200° C.) needs to be maintained, whereas for a standby state or a sleep mode, maintaining a prescribed temperature is desirable as such can contribute to reduced power consumption.

Figure 3:
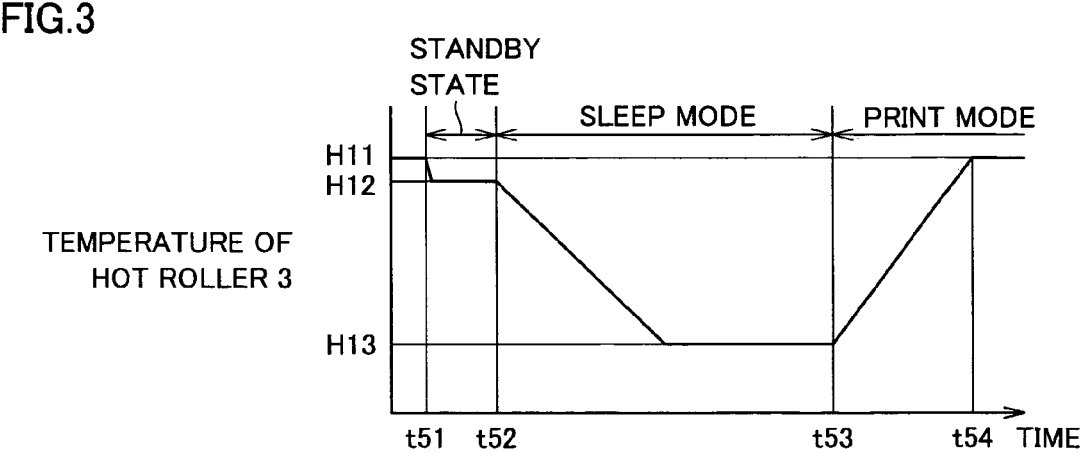
FIG. 3 is a diagram for illustrating a hot roller's temperature to be set in a variety of modes of a laser printer.

FIG. 3 is a diagram for illustrating a hot roller's temperature to be set in a variety of modes of a laser printer.

A print operation is suspended at a time t51. When at the time the print operation ends, the hot roller transitions from the current fusing temperature H11 to a slightly lower, standby temperature H12 (a temperature for a standby state that can immediately shift to the print operation).

When a prescribed period of time elapses with this temperature condition maintained, and a time t52 is arrived at, the control stops heating the hot roller. The hot roller provides a natural thermal radiation and thus generally decreases in temperature, and finally reaches a sleep temperature H13 (a temperature attained when residual heat is completely eliminated: substantially equal to ambient temperature).

In that condition at a time t53 the print start command is again input. In response the hot roller is again heated and thus reaches fusing temperature H11 at a time t54, when the print operation will start.

As such, as has been described previously, a temperature to be set should be changed to correspond to modes.

Figure 4:
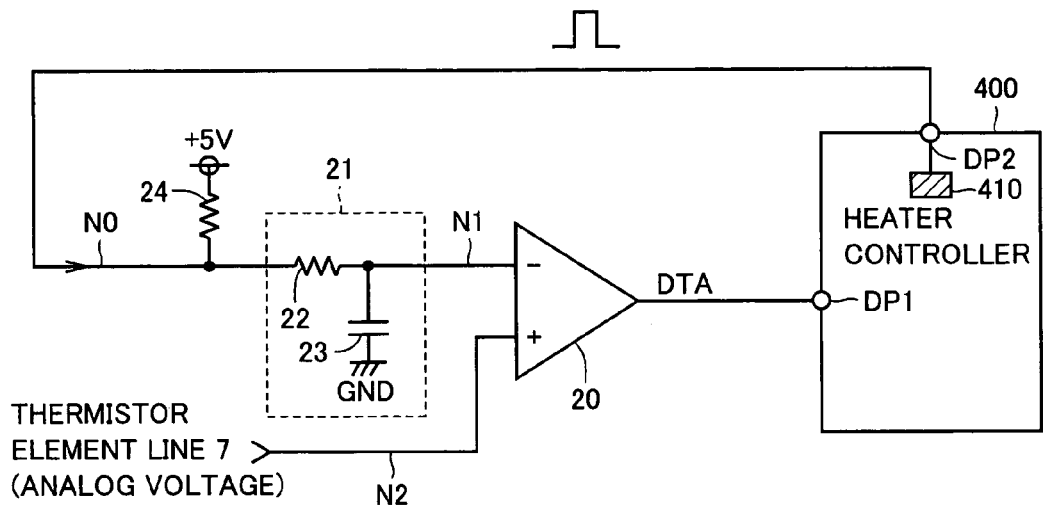
FIG. 4 shows a schematic configuration of the temperature detector according to the embodiment of the present invention.

With reference to FIG. 4, the present invention in an embodiment provides temperature detector 19 including resistors 22, 24, a capacitor 23, and a comparator 20.

Comparator 20 has one input node N2 electrically coupled with thermistor element line 7, and the other input node N1 connected to a smoother circuit 21.

Smoother circuit 21 includes resistor 22 between nodes N0 and N1, and capacitor 23 between node N1 and a ground voltage GND. Smoother circuit 21 smoothes or averages a pulse signal output from heater controller 400 via a digital port DP2, and transmits the smoothed (or averaged) pulse signal as an input voltage on node N1.

Resistor 24 is provided between node N0 and a prescribed drive voltage (5V) to pull up node N0 to a drive voltage level.

Comparator 20 compares an input voltage corresponding to the pulse signal output from heater controller 400 via a digital port DP2 smoothed with an analog voltage provided on thermistor element line 7 to output a detection signal DTA to a digital port DP1.

Heater controller 400 includes a pulse signal generation circuit 410 outputting a pulse signal to digital port DP2. The pulse signal generation circuit 410 can operate in response to instruction to generate the pulse signal and also adjust the pulse signal's duty ratio.

Figure 5:
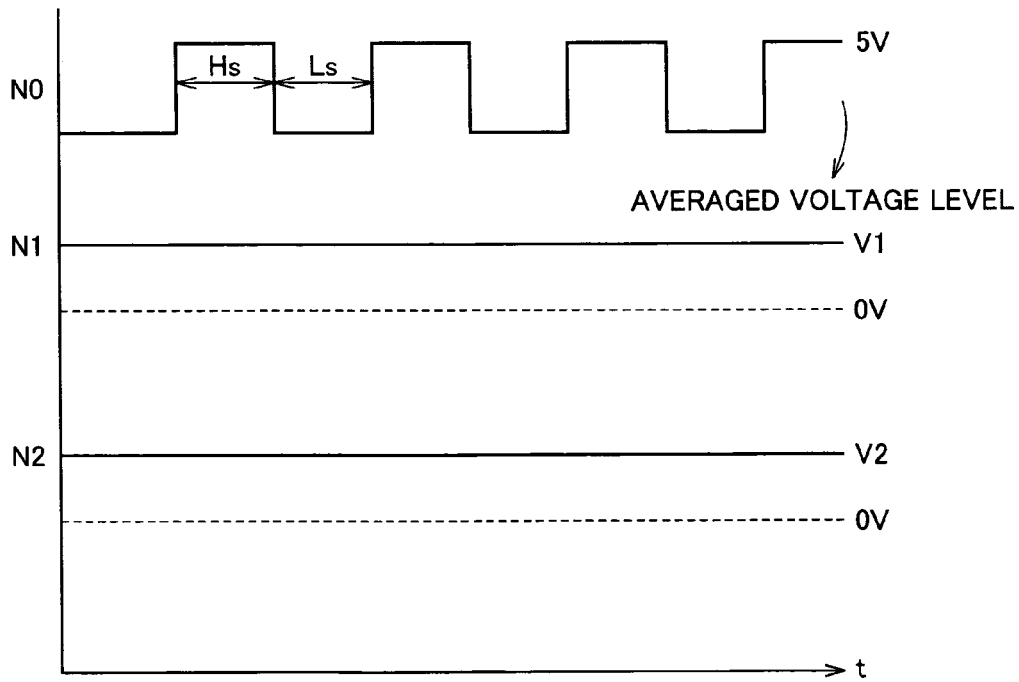
FIG. 5 is a diagram for illustrating a system allowing the temperature detector to detect temperature according to the embodiment of the present invention.

FIG. 5 is a diagram for illustrating a system allowing temperature detector 19 to detect temperature in the embodiment of the present invention.

In the present embodiment a temperature to be set is adjusted by a duty ratio of a pulse signal.

With reference to FIG. 5, node N0 receives a prescribed pulse signal from heater controller 400 via digital port DP2. This prescribed pulse signal is passed through and thus smoothed (or averaged) by smoother circuit 21. More specifically, the pulse signal is smoothed (or average) to have a prescribed voltage level based on a duty ratio defining the pulse signal's high level period Hs and low level period Ls. This prescribed voltage level and the analog voltage received from the thermistor detection element are compared by comparator 20 to output detection signal DTA.

For example, if an analog voltage level of node N2 is higher than a prescribed voltage level of node N1, detection signal DTA is set to "1".

In contrast, if an analog voltage level of node N2 is lower than the prescribed voltage level of node N1, detection signal DTA is set to "0".

Heater controller 400 operates in response to detection signal DTA received via digital port DP1 to perform a prescribed decision operation to control heater lamp 4 in temperature.

More specifically, if detection signal DTA is "1", which indicates that an analog voltage level on node N2 obtained from thermistor detection line 7 is higher than a prescribed reference voltage level on node N1, a decision can be made that the temperature is higher than that corresponding to the prescribed reference voltage.

If detection signal DTA is "0", which indicates that an analog voltage level on node N2 obtained from thermistor detection line 7 is lower than the prescribed reference voltage level on node N1, a decision can be made that the temperature is lower than that corresponding to the prescribed reference voltage. In accordance with this decision the heater lamp is controlled to turned on/off In the print mode, hot roller 3 is continuously held within a prescribed range of temperature, as described hereinafter.

Initially in the print mode heater lamp 4 is turned on to set a prescribed reference voltage to a voltage level corresponding to a maximum temperature (for example of 200° C.) in the print mode. More specifically, CPU 321 instructs heater controller 400 that the print mode is entered. In heater controller 400 pulse signal generation circuit 410 operates in response to the instruction issued from CPU 321 to adjust the pulse signal's duty ratio so as to set a voltage level corresponding to the maximum temperature (for example of 200° C.) and output the adjusted pulse signal, and when comparator 20 outputs detection signal DTA of "1" heater controller 400 turns off heater lamp 4 to stop the maximum temperature from further increasing.

Subsequently, the prescribed reference voltage is set to a voltage level corresponding to a minimum temperature (for example of 180° C.) in the print mode. More specifically, pulse signal generation circuit 410 operates in response to instruction issued from CPU 321 to adjust the pulse signal's duty ratio so as to set a voltage level corresponding to the minimum temperature (for example of 180° C.) and output the adjusted pulse signal, and when comparator 20 outputs detection signal DTA of "0" heater controller 400 turns on heater lamp 4 to stop the minimum temperature from further decreasing.

Thus switching the prescribed reference voltage in level and controlling based on a decision operation as described above can repeatedly be performed so that hot roller 3 in the print mode can be held constantly within the range of the maximum temperature (for example of 200° C.) to the minimum temperature (for example of 180° C.).

In the present embodiment, temperature detector 19 can adjust the prescribed reference voltage in level, as desired, by adjusting a duty ratio of a pulse signal generated by pulse signal generation circuit 410.

For example if in accordance with instruction issued from CPU 321 the pulse signal's high and low level periods are defined by a duty ratio of 1:1 then smoother circuit 21 sets the node N1 voltage level to 50% relative to the drive voltage (5V), i.e., 2.5V. As an example, if a temperature corresponding to the drive voltage (5V) is 300° C., and the duty ratio of 1:1 is set, then a voltage of 2.5V corresponding to 150° C. can be output from the smoother circuit.

As described above, as the heater controller 400 pulse signal generation circuit 410 can output a pulse signal with a controlled duty ratio smoother circuit 21 can output an adjusted, smoothed input voltage level on input node N1. A reference temperature corresponding to a reference value serving as a reference can thus be adjusted as desired.

In the present embodiment temperature detector 19 can control a reference voltage, i.e., a corresponding reference temperature by a duty ratio of a pulse signal output from pulse signal generation circuit 410 of heater controller 400. This can eliminate the necessity of comparing by a comparator by a threshold value using a resistor, as done in the conventional art. A reduced area for mounting, and temperature detection with high precision can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
a fuser having a heater used in forming an image to provide thermal fixation;
a temperature detector detecting a temperature of said fuser; and
a temperature controller controlling said heater based on a resultant detection of said temperature detector,
wherein: said fuser includes a hot roller heated by thermal conduction provided by said heater, a pressurization roller cooperating with said hot roller to pressurize a sheet inserted, and a temperature detection element transmitting a voltage in accordance with a temperature;
said temperature controller includes:
a pulse signal generation circuit operative in response to an instruction to output a pulse signal and also to adjust a duty ratio of said pulse signal,
a first digital port outputting said pulse signal from said pulse signal generation circuit, and
a second digital port receiving a digital signal corresponding to said resultant detection of said temperature detector;
said temperature detector includes:
a smoother circuit receiving said pulse signal from said pulse signal generation circuit to smooth and output said pulse signal as a reference voltage, and
a comparator comparing the voltage transmitted from said temperature detection element with said reference voltage to output a resultant comparison to said temperature controller; and
said pulse signal generation circuit adjusts said duty ratio of said pulse signal in accordance with a mode.

2. The image formation apparatus according to claim 1, wherein said mode comprises one of a sleep mode, a standby mode, and a print mode.

3. An image formation apparatus comprising:
a fuser having a heater used in forming an image to provide thermal fixation;
a temperature detector detecting a temperature of said fuser; and
a temperature controller controlling said heater based on a resultant detection of said temperature detector,
wherein: said fuser includes a temperature detection element transmitting a voltage in accordance with a temperature;
said temperature controller includes a pulse signal generation circuit operative in response to an instruction to output a pulse signal and also to adjust a duty ratio of said pulse signal; and
said temperature detector includes:
a smoother circuit receiving said pulse signal from said pulse signal generation circuit to smooth and output said pulse signal as a reference voltage, and
a comparator comparing the voltage transmitted from said temperature detection element with said reference voltage to output a resultant comparison to said temperature controller.

4. The image formation apparatus according to claim 3, wherein said temperature controller includes a first digital port outputting said pulse signal from said pulse signal generation circuit, and a second digital port receiving a digital signal corresponding to said resultant detection of said temperature detector.

5. The image formation apparatus according to claim 3, wherein said fuser includes a hot roller heated by thermal conduction provided by said heater, and a pressurization roller cooperating with said hot roller to pressurize a sheet inserted.

6. The image formation apparatus according to claim 3, wherein said pulse signal generation circuit adjusts said duty ratio of said pulse signal in accordance with a mode.

7. The image formation apparatus according to claim 6, wherein said mode comprises one of a sleep mode, a standby mode, and a print mode.

* * * * *